United States Patent Office 2,834,207
Patented May 13, 1958

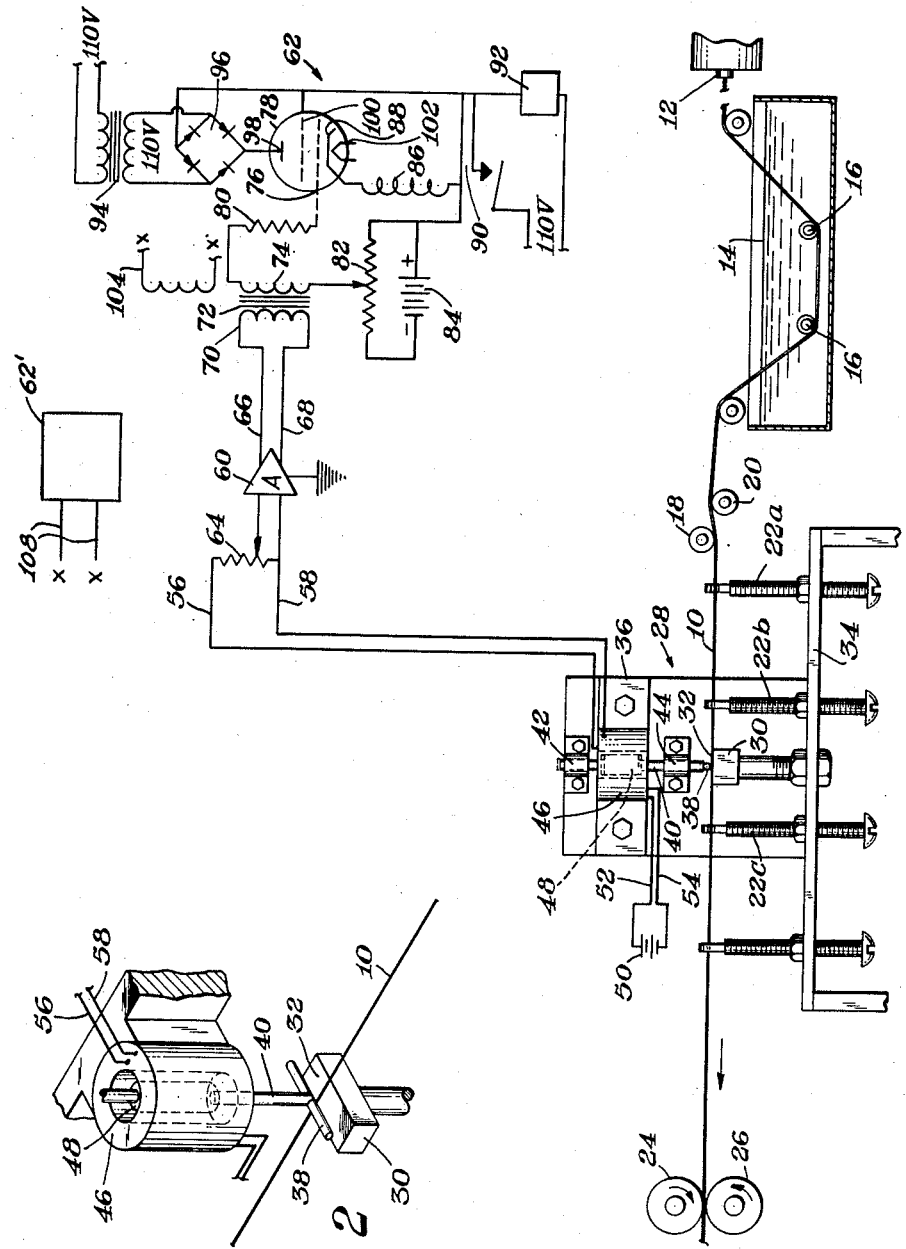
May 13, 1958    M. CHAMBERLAIN ET AL    2,834,207
GEL COUNTER
Filed March 29, 1954
INVENTORS
Malcolm Chamberlain
Paul V. Greenfield
BY
Griswold & Burdick
ATTORNEYS.

2,834,207

GEL COUNTER

Malcolm Chamberlain and Paul V. Greenfield, Midland, Mich., assignors to The Dow Chemical Company, Midland, Mich., a corporation of Delaware Application March 29, 1954, Serial No. 419,558

5 Claims. (Cl. 73—160)

This invention relates to means for measuring surface imperfections in filamentary or sheet-like materials, and particularly to apparatus for determining the number of gels in lengths of plastic materials which pass through the apparatus.

Surface imperfections of the type known as gels often appear in sheets or strands of plastic material. They are inhomegeneities due primarily to faulty or non-uniform processing of the raw materials or to the presence of foreign matter in the sheet or strand.

Surface imperfections having heights of a mil or less prove to be quite noticeable to the eye as well as troublesome in further processing or manufacturing. It is desirable that means be provided to measure quantitatively the frequency of occurrence of such gels in order to control the quality of the product during the manufacture of plastic films, sheets, or filamentary strands.

Although surface imperfections such as gels occur as rather abrupt changes in thickness of the strand or sheet, most of the previous convenient ways of quantitatively determining changes in thickness of filamentary and sheet-like materials have recorded both gradual and abrupt changes in thickness with equal facility. Such means are not well suited for use in determining the number of gels in a strand or sheet since the mean diameter of the material being tested may vary at a gradual rate over a wider range than that corresponding to the abrupt changes in thickness which are due to the gels which are to be counted. Obviously, if both abrupt and gradual changes in thickness are registered, spurious results are often indicated by these measuring devices.

Further, most of the known devices for measuring on recording surface imperfections of plastic materials are somewhat delicate and require careful handling and critical adjustment. Such devices are not well adapted for use in conjunction with mass production facilities where ease of installation, a high degree of operational stability, and minimum maintenance requirements are pre-requisites to satisfactory performance.

Experience has indicated that gels of a certain range of sizes are predominantly due to foreign matter which contaminates the raw material while gels having a generally larger mean size tend to form as a result of fibrous bits in or near the surface. These fibrous bits are usually due to faulty processing of the base material. A means for roughly indicating the type of gels in the material would thus serve a useful purpose in helping to analyze what caused the plastic to become unsuited for production use.

It is, accordingly, a principal object of this invention to provide improved apparatus for measuring surface imperfections in sheets or strands of plastic material.

Another object of this invention is to provide improved means for measuring surface imperfections in which the means for measuring is unaffected by gradual changes in thickness of the material being tested.

A further object of this invention is to provide improved, more rugged means for measuring surface imperfections which selectively register only those imperfections which exceed a predetermined size.

An additional object of this invention is to provide an improved gel counter adaptable for use with ribbon-like filaments of plastic material which provides visual indications of the number of gels exceeding selected predetermined amplitudes.

An ancillary object of this invention is to provide an improved gel counter which is rugged, easy to operate, and economical to make.

In accordance with the present invention the motion of a stylus-bearing member which is in contact with the surface being tested is utilized in connection with a magnetizable element secured thereto to induce small potentials in a coil. These small induced potentials, which are indicative of the size of the gel, are then amplified and utilized to actuate indicating means of suitable type. In some embodiments of the invention a plurality of indicating means, each operable by signal potentials of a predetermined amplitude range, are utilized to indicate roughly the frequency of occurrence of gels resulting from foreign bodies as compared with that of gels occurring as a result of improper processing of the raw materials of which the monofilament or sheet is composed. The invention as well as additional and related objects thereof will best be understood when the following detailed description is read in relation to the accompanying drawings, in which:

Fig. 1 is a combination elevational and diagrammatic view of gel counting apparatus made in accordance with the present invention, and Fig. 2 is a fragmentary perspective view, on an enlarged scale, of the pickup stylus and coil arrangement shown in Fig. 1.

In the drawings, the gel counter of the invention is shown installed on extrusion equipment for making plastic monofilament. Referring to Figs. 1 and 2, a monofilament 10 of plastic material, such as ethyl cellulose, for example, extends from an extrusion die 12, through a water bath 14 where it passes under the rollers 16, between a pair of drying and vibration damping rollers 18, 20, through an array of guide fingers 22a, b, c, d and through the drawing rollers 24, 26. The guide fingers 22a, b, c, d have slots opening from alternate sides through which the monofilament is threaded. After the monofilament leaves the drawing rollers 24, 26, it is wound onto a spool (not shown) or otherwise utilized in any desired manner. The gel counting pickup assembly 28 is disposed between the guide fingers 22b and 22c. The pickup assembly 28 includes an anvil member 30 having a surface 32 over which the monofilament strand 10 passes. The anvil member 30 is secured to a base plate member 34 on which each of the guide fingers 22a, b, c, d also is mounted. The base plate member 34 is in turn either shock mounted or otherwise supported in a substantially vibration-free manner. A mounting frame member 36 is secured to the base plate 34 and is the supporting structure for the pickup means which includes the elongated stylus 38, which is disposed and secured transversely to the end of the stylus rod 40 and rides on the monofilament 10 as the strand passes over the surface 32 of the anvil 30. The stylus rod 40 is maintained in spaced relation with respect to the mounting frame member 36 by the guide bearings 42, 44 which permit the stylus rod 40 to move freely along its longitudinal axis.

A coil 46 having two windings, each of which is insulated from the other, is wound in the form of a hollow cylinder and is disposed between the guide bearings 42, 44; the stylus rod 40 passes through the hollow core of the coil 46, and has attached thereto a soft iron slug 48 which extends at least partly within the hollow core of the coil 46. The coil 46 is secured to the frame member 36. The field winding of the coil 46 is connected by means of the leads 52, 54 to a source of direct current potential illustrated as the battery 50 and serves to magnetize the slug 47. The second coil is coupled by way of the leads 56, 58 to an electronic amplifier 60 and indicating circuit 62 which will be described in greater detail later.

A potentiometer 64 is electrically coupled to the leads 56, 58 and to the amplifier 60 to permit the control of the amplification of the potential in the leads. The amplifier 60 may be of any suitable type, such as a conventional cascade type, resistance coupled amplifier which has sufficient voltage gain, on the basis of the limited input signal potential, to supply an output pulse of sufficient amplitude to trigger or actuate the chosen indicating means or mechanism.

Referring now to the counter or indicating circuit, the output of the amplifier 60 is coupled, via the leads 66, 68 to the primary winding 70 of the transformer 72. One end of a secondary winding 74 of the transformer 72 is connected to the control grid 76 of a thyratron 78 through a grid current limiting resistor 80. The other end of the secondary winding 74 is connected to the movable contact of a potentiometer 82 which is shunted across a bias source, illustrated as the battery 84. The positive terminal of the bias source 84 is connected, through a relay coil winding 86, to the cathode 88 of the thyratron 78. An adjustment of the movable contact 82 changes the negative bias between the cathode and control grid of the thyratron 78, and acts as a sensitivity control for setting the minimum amplitude of induced pulse from the amplifier 60 which is required to trigger the thyratron 78. The relay 90, of which the winding 86 is a part, is of a low inertia type and is utilized, in the illustrated example, to close the 110 volt circuit of an electrically energized mechanical counter 92. The high voltage operating potential for the thyratron 78 is obtained through an isolating transformer 94 and a bridge type rectifier 96 whose output is unfiltered, the positive terminal of the bridge rectifier being connected to the anode 98 of the thyratron 78 and the negative terminal being connected to the screen grid 100 and to the cathode 88 through the relay winding 86. The heater 102 of the thyratron 78 may be energized from the power supply of the amplifier 60, or from an external potential source.

The operation of the gel counter shown in Fig. 1, is as follows: A monofilamentary strand of plastic 10 is extruded from the extrusion die 12 and is drawn, under tension, by the driving rollers 24, 26 through the water bath 14, the guide fingers 22a,b,c,d and over the anvil surface 32. The stylus 28 is maintained substantially parallel to the surface 32 of the anvil 30 but is free to move along the longitudinal axis of the stylus rod 40 as previously mentioned. The alternate slot arrangement of the guide fingers 22a,b,c,d prevents lateral or rotary movement or possible "whipping" of the monofilament from side to side in event the drawing rollers 24, 26 are driven at an uneven rate or prevents the monofilament from bouncing off the surface 32 when a large and sudden change in diameter of the monofilament occurs. In addition, because the monofilament bears against a different surface at each guide finger 22, the tendency to twist the filament is reduced. Twisting of the filament, in event the extrusion die became or is out-of-bound or eggshaped, would introduce errors since a sudden twisting of an out-of-round filament would be indicated as the same sudden change in diameter as would a gel or other surface imperfection.

It should be noted that the guide fingers 22 are detachably mounted to the base plate member 34, and that upon the removal of the guide fingers 22 the anvil surface 32 and stylus 28, as well as the drawing rollers, are suited to the passage of a ribbon or strip of material therethrough for gel counting purposes. The strip or ribbon source could be an adjacently disposed extrusion die or a sample of a sheet of plastic material on which a gel count is desired. When the monofilament 10 is drawn past the stylus 28, especially at high velocity, some vibrations from the extrusion machinery or intermediate points may have sufficient amplitude to displace physically the stylus 28 and appear on the indicator 62 as small gels. To lessen this possibility, the rollers 18, 20 are coated with a material such as chamois or suitable spongy material which dries the monofilament as it leaves the water bath 14 as well as dampens any vibrations. These rollers are not needed when the vibration is slight and may sometimes be eliminated. Likewise, water baths of other constructions may be utilized, the type illustrated being merely an example of a suitable type.

When a gel passes between the surface 32 and the stylus 28, the stylus rod 40 moves longitudinally, changing the magnetic field of the coil 46 by virtue of the movement of the soft iron slug 48 which is magnetized by the field winding. If the slug 48 is composed of a permanently magnetic material such as Alnico or similar material, no field winding would be needed in a transducer of this type. The change in the magnetic field configuration results in a small potential being induced in the winding of the coil 46 which is connected to the amplifier 60 by the leads 56, 58. In event the monofilament or sheet being tested for gels is sufficiently stiff that the weight of the stylus rod 40 does not deform it, the anvil 30 may not be needed. However, it should be recognized that passing the filament or sheet over the surface 32 assures that gels occurring on either the upper or lower surface will be registered.

Since abrupt changes in thickness and diameter of the sheet or strand are to be measured, the sheet or strand should pass by the stylus 28 at a velocity which is sufficient to cause a gel or other surface imperfection to result in a relatively large change in the magnetic field configuration surrounding the coil 46 and which produces induced potentials which are large enough to give a usable output when coupled to the input of the amplifier 60. In a typical installation, a gel of one mil amplitude was found to provide an induced potential of .05 volt from the signal winding of the coil 46 when the monofilament strand 10 passed the stylus 28 at a rate of 78 feet per minute.

If the gel count is to be related to frequency of occurrence, the strand or ribbon should pass the stylus 28 at a substantially constant velocity. In practice, a constant speed electric motor (not shown) coupled to the drawing rollers 24, 26 has been used for this purpose.

The action of the counting operation is as follows: the potential generated when a gel or other surface imperfection vibrates the stylus 28 is amplified and coupled to the control grid 76 of the thyratron 78. Assuming that the amplified pulse has sufficient amplitude to overcome the fixed negative bias and triggers or causes the thyratron to fire or become conductive, the current flow through the cathode circuit of the thyratron 78 energizes the relay 90 which in turn causes the counter 92 to advance one count. The thyratron 78, having been triggered or fired, will continue to conduct until the anode-cathode potential difference is lowered to or below the extinction potential, which is near to zero. This is accomplished in the illustrated circuit by applying un-filtered direct current in which the potential drops approximately to zero each half cycle of the alternating current to the anode of the thyratron 78. Because the bridge-type rectifier illustrated is a full wave rectifier, the thyratron will be deionized each half cycle, 120 times per second for the customary 60 cycle supply. This means that the counter will not distinguish between gels which occur at a rate of more than 120 per second, but the error thus introduced, for practical purposes, is negligible. If a greater gel counting frequency rate is desired, other known means for decreasing the deionization time of the thyratron may be used without departing from the spirit of the invention.

Although only one counting circuit arrangement has been shown, other secondary windings of the transformer 72 such as the winding 104 may be connected to counting circuit arrangements, such as shown in Fig. 1 as the block 62', for example which are generally similar to the one connected to the secondary winding 74. The leads 108 of the counting circuit arrangement 62' are connected, as indicated by the x—x marks, to the secondary winding 104. In such circuit arrangement, the bias on the individual thyratrons would be varied, by adjusting the movable arm of the potentiometer 82, and the indicators would then give a selective indication of the gel amplitude in addition to merely counting the gels. Such a plurality indicating device has utility as a somewhat crude analytical instrument since, as mentioned previously, it has been found that gels which occur as a result of different defects have different mean amplitudes.

For example, gels due to dust or other airborne foreign matter are small and predominantly within a given size range. On the other hand, gels due to fibrous material in the extruded strand or in the sheet are indicative of poor processing of the raw material and usually are of larger size than gels due to foreign matter. Thus, it can be seen that a multiple indicating device has utility as an analytical instrument whose count of various size gels may be used to analyze the type of defect occurring in plastics production operation.

While the invention has been illustrated and described principally in connection with measuring or counting gels or surface defects occurring in a monofilament strand, it can be seen that the unit could also be used with equal facility to check the gel count on a sheet of plastic during production thereof.

Likewise, it can be seen that the pickup stylus and the coil are rugged and the stylus cannot be damaged by excessive longitudinal movement, even though the movement be a matter of inches. The electrical circuit is simple, and in case of failure of any part, repair or substitution of any part or unit may be quickly done. Energization of the field winding of the coil may be accomplished by a conventional storage battery.

What is claimed is:

1. Apparatus for measuring surface imperfections in strands or sheets of plastic material, comprising a signal pickup assembly, driving means for drawing said material past said pickup assembly, vibration damping means, said damping means being disposed in physical contact with said material and disposed on the side of said pickup assembly which is remote from said driving means, said pickup assembly including a hollow coil having a signal winding, a rod-like stylus member adapted to be in substantially continuous contact with the surface of the material being mounted to permit free longitudinal vertical movement thereof, and having a portion which extends into the interior of said coil, magnetic means secured to that portion of said stylus which extends into said coil, whereby longitudinal motion of said stylus member moves said magnetic member with respect to said signal coil and induces an electrical signal therein, indicator means for registering said surface imperfections, and electronic amplifier means having an input circuit coupled to said signal coil and an output circuit coupled to said indicator means.

2. Apparatus in accordance with claim 1, wherein said indicator means comprises a plurality of electronically controlled counters each of which may be pre-set to respond to signals exceeding a predetermined amplitude.

3. Apparatus for measuring surface imperfections in a strand of plastic material, comprising a pickup assembly, motor driven roller means for drawing said material past said pickup assembly, means including a plurality of guide fingers disposed adjacent to said pickup assembly for preventing sudden rotatory movement of said strand as it passes said pickup assembly, said pickup assembly including a rod-like stylus-bearing member of maintaining substantially constant contact with the surface of the material and mounted to permit free longitudinal vertical movement thereof, a hollow coil having at least a signal winding, a portion of said stylus bearing member extending through the interior of said coil, magnetizable means, said magnetizable means being secured to that portion of said stylus bearing member which extends through said coil, means whereby longitudinal motion of said stylus member moves said magnetizable means with respect to said signal winding and induces an electrical signal therein, electronically controlled indicator means for registering said surface imperfections which exceed a predetermined amplitude, and electronic amplifier means having an input circuit coupled to said signal winding and an output circuit coupled to said indicator means.

4. Apparatus in accordance with claim 3, wherein said magnetizable means comprises a slug of material having permanent magnetic properties.

5. Apparatus in accordance with claim 3, wherein said hollow coil has a field winding which is utilized to magnetize said magnetizable means.

References Cited in the file of this patent

UNITED STATES PATENTS

| | | |
|---|---|---|
| 2,074,417 | Olsen | Mar. 23, 1937 |
| 2,242,889 | Keeler | May 20, 1941 |
| 2,295,795 | Keeler | Sept. 15, 1942 |
| 2,506,174 | Price | May 2, 1950 |
| 2,621,224 | Priest | Dec. 9, 1952 |
| 2,674,127 | Garrett et al. | Apr. 6, 1954 |